United States Patent
Sheely

[15] 3,639,103
[45] Feb. 1, 1972

[54] FLUID BED REACTORS
[72] Inventor: Harold R. Sheely, Newton, Mass.
[73] Assignee: The Badger Company, Inc., Cambridge, Mass.
[22] Filed: Apr. 21, 1970
[21] Appl. No.: 30,456

[52] U.S. Cl.......................23/288 S, 252/417, 260/346.4, 260/465.3
[51] Int. Cl...................B01j 9/20, B01j 11/04, C07c 121/02
[58] Field of Search................23/28 S, 1 F, 1 FT; 260/465.3, 260/346.4; 208/164; 252/417, 418

[56] References Cited

UNITED STATES PATENTS

| | | | |
|---|---|---|---|
| 2,494,614 | 1/1950 | Crote | 23/288 S X |
| 2,488,406 | 11/1949 | Hirsch | 23/288 S X |
| 2,943,997 | 7/1960 | MacLaren et al. | 208/164 X |
| 2,901,331 | 8/1959 | Held et al. | 23/288 S |
| 2,883,332 | 4/1959 | Wickham | 23/288 S X |
| 2,428,873 | 10/1947 | Gunness et al. | 23/288 S X |
| 2,881,132 | 4/1959 | Hengstebeck | 23/288 S X |
| 3,480,408 | 11/1969 | Lacroix | 23/288 S |

Primary Examiner—Joseph Scovronek
Attorney—Schiller & Pandiscio

[57] ABSTRACT

Improved fluid bed reactors characterized by downcomers for increasing the rate of catalyst turnover from the reaction zone to a catalyst regeneration zone. The invention is applicable to the production of unsaturated nitriles by the vapor phase reaction of oxygen, ammonia, and an olefin, as well as to other catalytic vapor phase reactions.

9 Claims, 5 Drawing Figures

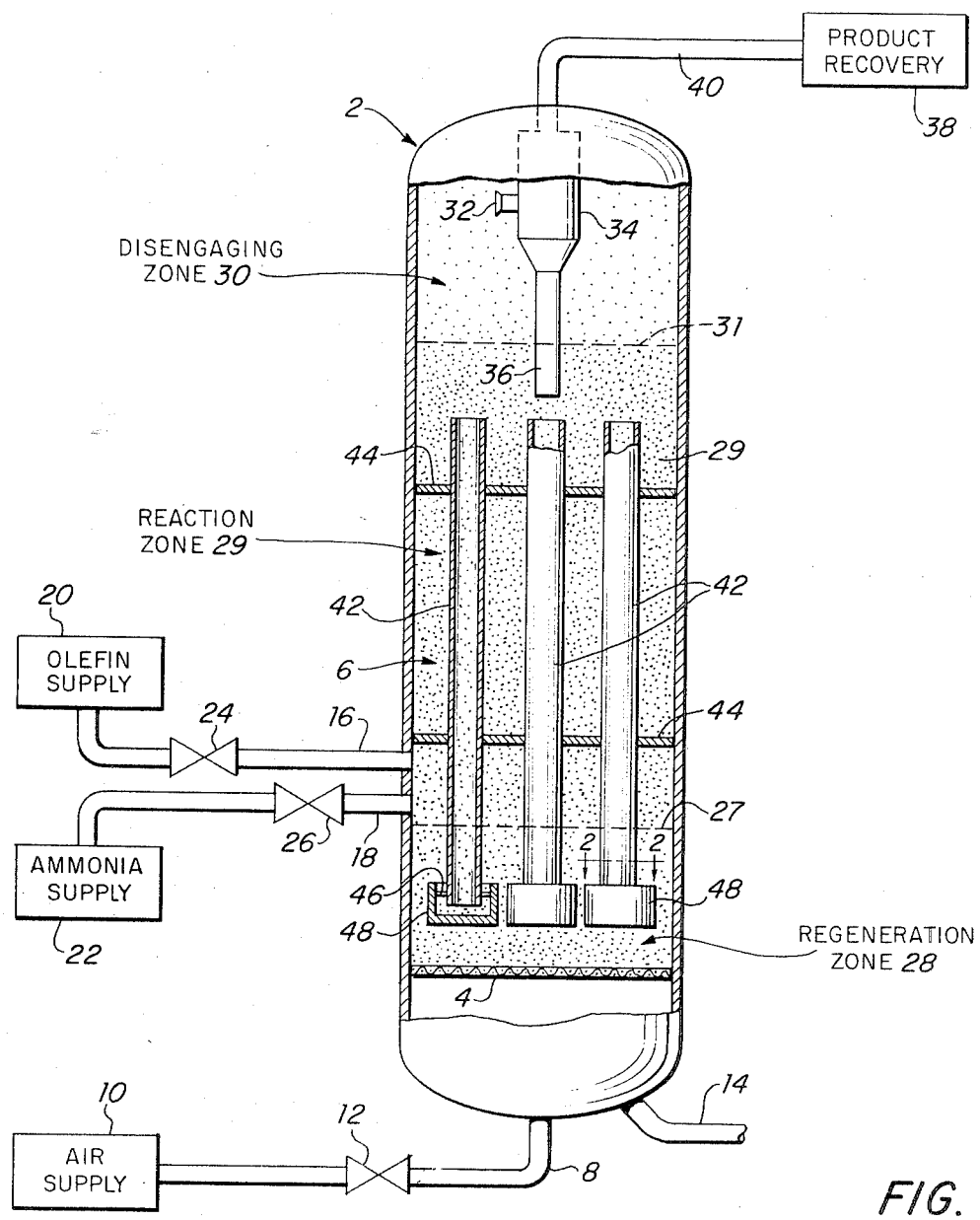
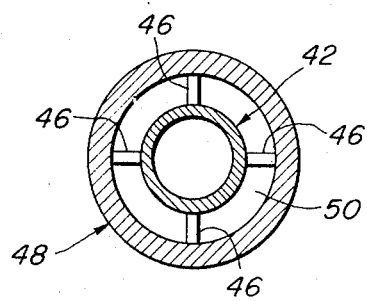
FIG. 2.
FIG. 1.
HAROLD R. SHEELY
INVENTOR.
BY
Schiller & Pandiscio
ATTORNEYS.

HAROLD R. SHEELY
INVENTOR.

BY

Schiller & Pandiscio
ATTORNEYS

FLUID BED REACTORS

This invention relates to fluid bed reactors and more particularly to provision of an improved fluid bed reactor for use in systems involving the continuous conversion of reactant vapors.

It has been found that the effectiveness of a reactor comprising one or more fluidized catalyst beds can be greatly improved by providing continuous recirculation or turnover of the particulate catalyst. One reason suggested for the increased effectiveness, as reflected by greater yield and/or greater conversion, is that the recirculation compensates for or prevents classification of the catalyst particles. It also helps maintain, where necessary, a more uniform temperature throughout the height of the bed.

As is also well known, in conducting certain vapor-phase catalytic reactions in a fluid bed reactor it is necessary to continuously regenerate the particulate catalyst. Accordingly, it is customary practice to withdraw the spent catalyst from the reactor, pass it to a separate vessel where it is regenerated, and then return the reactivated catalyst to the reactor. This technique is shown in U.S. Pat. No. 2,847,360. Another technique is to use an autoregeneration zone in the reactor. Thus, for example, with respect to the manufacture of unsaturated nitriles by the catalytic vapor-phase reaction of oxygen, ammonia and an olefin, it is well known, as exemplified by U.S. Pat. No. 3,427,343, to regenerate the catalyst continuously by contacting it with molecular oxygen which is introduced to the fluidized catalyst bed at a selected point upstream of the zone at which the other reactants are introduced. Typically, the molecular oxygen is introduced in the form of air at the bottom of the fluid catalyst bed while the other reactants are introduced at a higher elevation. Contact with molecular oxygen restores spent catalyst at the bottom of the bed to a previous high valence state. During its upward flow to the bed the reoxidized catalyst is gradually reduced as the surrounding oxygen level decreases. While this method of autoregeneration does extend the time that the process may be operated continuously, the rate of catalyst regeneration is less than it would be if conducted in a separate regeneration vessel. I have recognized that increasing the rate of catalyst turnover will improve the performance of the autoregeneration zone since it will allow the catalyst to be held at a higher average level of activity which in turn will improve the overall performance of the reactor in terms of percent conversion of reactants and reaction time. Furthermore, even in reactors where there is no autoregeneration zone, increasing the rate of catalyst turnover offers the advantages of more effective heat transfer and temperature control and reduced classification of catalyst particles in the bed.

Accordingly, the primary object of this invention is to provide means for improving the performance of fluid bed reactors.

A more specific object is to provide means for increasing the rate of catalyst turnover in a fluid bed.

Still another specific object is to provide means for improving the performance of a catalyst autoregeneration zone in a fluid bed reactor.

A further object is to provide an improved fluid bed reactor for use in carrying out vapor-phase catalytic reactions on a continuous basis.

Another object is to provide an improved fluid bed reactor for carrying out oxidation reactions such as oxidation of (a) olefin-ammonia mixtures to nitriles, and (b) naphthalene to phthalic anhydride.

These and other objects are achieved by provision of downcomers within the catalyst bed. The bottom ends of the downcomers are designed or adapted so that gas or vapor flow cannot channel up through the downcomers. As a result catalyst can only flow downward in the downcomers. The catalyst phase in the downcomers is substantially more dense than the catalyst phase in the surrounding bed and this difference in density provides the driving force for causing catalyst to circulate from the top to the bottom of the bed. In one illustrated embodiment of the invention hereinafter described, the reactor includes an autoregeneration zone at the bottom of the bed and the downcomers are arranged to circulate catalyst from near the top of the bed down into the autoregeneration zone.

Other features and many of the advantages of the invention are disclosed or rendered obvious by the following detailed specification which is to be considered together with the accompanying drawing wherein:

FIG. 1 illustrates a reactor embodying the invention;

FIG. 2 is a cross-sectional view taken along line 2—2 of FIG. 1;

Figure 3A:
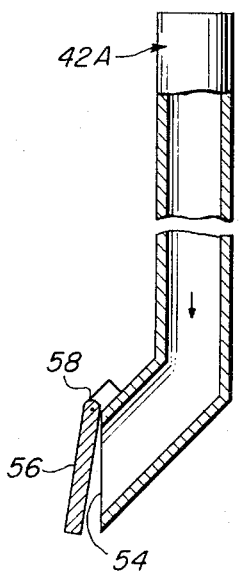
Figure 3B:
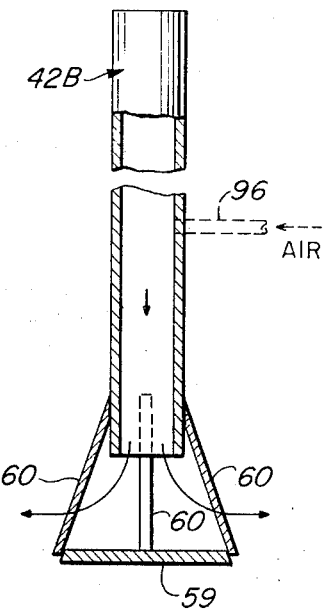
Figure 4:
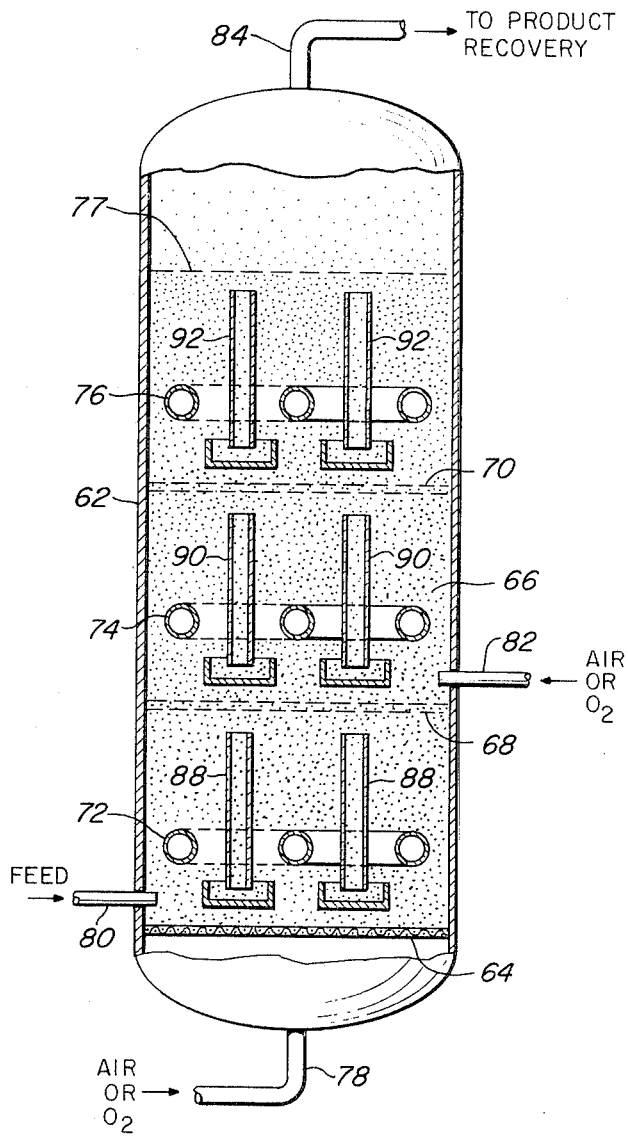

FIGS. 3A, and 3B illustrate different forms of downcomers that may be used in the reactor of FIG. 1; and FIG. 4 illustrates another reactor embodying the invention.

Turning now to FIG. 1, there is shown a reactor having an autoregeneration zone. While this reactor may be used to carry out various reactions, it is described hereinafter as it would be set up to oxidize olefin-ammonia mixtures to unsaturated nitriles such as acrylonitrile and methacrylonitrile. The reactor comprises a reactor vessel 2 containing a dense phase catalyst bed 6.

Various catalysts may be employed in producing nitriles. Preferably the catalyst consists of the combined oxides of antimony and uranium prepared as described in U.S. Pat. No. 3,427,343. Other catalysts that may be employed are those set forth in U.S. Pat. Nos. 2,904,580, 2,941,007, 3,044,966, 3,050,546, 3,427,343 and 3,230,246.

The catalyst bed is maintained in a turbulent fluidized state by the passage of an upwardly directed stream of a selected fluid in gas or vapor form. The fluid used to fluidize the catalyst bed may be one of the reactants or may consist of or comprise some other material in gas or vapor form that does not enter into the reaction which is to be carried out in the reactor, e.g., an inert gas such as helium. In the illustrated embodiment the fluidizing gas may be either oxygen or some gas capable of supplying molecular oxygen to the reaction, e.g., air. The fluidizing gas preferred in converting olefin-ammonia mixtures to unsaturated nitriles is air.

The reactor vessel illustrated in FIG. 1 also has a transverse recticulate grid 4 near its bottom end which serves to support catalyst bed 6 and to provide a more uniform distribution into the bed of the fluidizing gas which is introduced to the bottom of the reactor through a line 8 which is connected to a supply of air 10 via a feed rate control device such as a valve 12. Another inlet line 14 may be provided for introducing a supplemental fluidizing gas if desired. Of course the grid 4 may be omitted and fluidization of the bed achieved by connecting the air inlet line 8 to one or more sparger pipes disposed in the bed.

Additional inlet lines 16 and 18 connect the vessel 2 to suitable supplies 20 and 22 of olefin and ammonia gas through additional feed rate control devices such as valves 24 and 26 respectively. The inlet lines 16 and 18 may discharge directly into the reactor as shown or may terminate in suitable discharge devices in the reactor designed to distribute the reactants uniformly throughout the catalyst bed. Thus, for example, the lines 16 and 18 may terminate in or be connected to headers provided with more or less evenly spaced nozzles located in the catalyst bed. In the illustrated embodiment the lines 16 and 18 introduce the reactants into the catalyst bed at a level or levels substantially above the distributing grid 4, with the result that the portion of the bed below where the olefin and ammonia are introduced is relatively rich in molecular oxygen supplied via line 8. This portion of the bed, demarcated for convenience by the broken line 27, is hereinafter referred to as the regeneration zone 28. That portion of the bed above the broken line 27 is hereinafter referred to as the reaction zone 29. In actual practice, of course, there is no sharp demarcation between the two zones and some reaction will occur in the regeneration zone while some regeneration will occur in the lower end of the reaction zone.

Above the dense-phase catalyst bed is a dilute phase or disengaging zone 30 (demarcated by broken line 31) where separation of the catalyst particles from the reaction mixture occurs. The reaction mixture and whatever amount of catalyst is entrained therein passes out of the dilute-phase catalyst suspension in the upper portion of the reactor vessel through an inlet opening 32 in a conventional cyclone separator 34. The entrained catalyst particles are removed from the reaction effluent in the separator 34 and returned to the dense-phase catalyst bed by way of a standpipe 36. The substantially catalyst-free reaction effluent is passed overhead to recovery equipment 38 by way of a line 40 connected to separator 34. Although, not shown, the reactor may also include heat exchangers disposed in the catalyst bed to control the reaction temperature.

The improvement provided by the present invention consists of provision of novel means for circulating catalyst from the reaction zone to the regeneration zone. In the illustrated embodiment of FIG. 1 the catalyst circulating means consists of a plurality of downcomer pipes 42 which are physically suspended within the dense-phase catalyst bed 6. The upper end of each downcomer is below the dilute catalyst phase level and its lower end terminates in the regeneration zone, preferably near to the distributing grid 4. The downcomers are held in place by suitable means secured to the side or end walls of the vessel. In FIG. 1 the downcomers are supported by horizontally extending struts 44 which are affixed to the interior surface of the sidewall of the reactor vessel. The struts 44 are secured to the downcomers and the reactor by suitable means, e.g., by welding. The struts 44 are arranged and are sized so as to occupy minimum space in the reactor and thereby provide minimum impedance to movement of catalyst particles and flow of reactant gases. The upper and lower ends of the downcomers 42 are open; however, affixed to the lower end of each downcomer by a spider arrangement consisting of a plurality of arms 46 (see FIG. 2) is a cup 48. The latter surrounds but is spaced from the bottom end of the downcomer so as to provide an annular passageway 50 through which catalyst particles can be discharged from the downcomer. The cups 48 act as baffles to (a) direct discharge of the catalyst particles into the upwardly flowing gas stream as indicated by the arrows in FIG. 2 and (b) direct the upwardly flowing gas stream past the bottom ends of the downcomers. As a result the upwardly flowing gas stream bypasses the bottom ends of the downcomers while catalyst particles flowing downward in the downcomers pass through the annular passageways 50 and are picked up by the rising stream of gas.

It is to be noted that the olefin and ammonia need not be introduced by separate lines but may be premixed and introduced by either of the lines 16 and 18. The level at which these reactants are introduced to the reaction zone is not fixed but may vary according to the height and width of the catalyst bed. Preferably they are introduced to the reactor at a level where the catalyst bed is richest in fully regenerated catalyst. Similarly the downcomers may extend down to various depths in the regeneration zone but preferably as close as possible to the grid 4 without impeding flow of gas through the grid or discharge of catalyst particles into the regeneration zone.

In operation of the reactor to produce nitriles, the olefin feedstock, ammonia and air are continuously supplied to the reactor in predetermined relative proportions whereby upon contact with the catalyst the desired oxidation reaction occurs to produce an unsaturated nitrile. Additionally the air is discharged into the reactor at a velocity sufficient to fluidize the catalyst bed. As the reaction proceeds the catalyst particles in the reaction zone are reduced to a lower, less active oxidation level as a result of contact with the reactants and because the amount of surrounding oxidizing gas (i.e., molecular oxygen) decreases as the particles flow upwardly in the bed. However, the catalyst particles nearing the top of the bed 6 migrate into the downcomers 42 and flow downward by gravity. The catalyst phase in the downcomers is relatively more dense than that of the surrounding bed (because of the relatively low concentration of gas in the downcomers as compared to that in the bed), and this difference in density provides the driving force that causes the catalyst particles to circulate from the top of the bed down thru the downcomer and back into the regeneration zone of the bed via the annular passageways 50. The catalyst particles returned to the regeneration zone by the downcomers are contacted by fresh air rising through the distribution grid 4. Because the regeneration zone is rich in molecular oxygen, the spent catalyst particles are rapidly regenerated, i.e., reoxidized to a highly active oxidation level. As a result the average oxidation state of the catalyst particles in the reaction zone is maintained at a higher level, thereby promoting the oxidation reaction so that catalyst contact time can be reduced and throughput increased.

FIGS. 3A and 3B show downcomers with other means that may be used in place of cups 48. In FIG. 3A the bottom end of downcomer 42A is angulated so as to terminate in a side opening 54 which is fitted with a flapper valve in the form of a plate 56 that is pivoted at 58 so that in its normal at rest position it closes the opening 54. However, when the downcomer is filled with catalyst, the latter causes the plate 56 to swing open (as shown) to permit the catalyst to discharge into the regeneration zone as indicated by the arrows in FIG. 3A. The embodiment of FIG. 3B comprises a downcomer pipe 42B which carries at its bottom end a flat solid baffle plate 59 that is held in spaced relation to the downcomer by a plurality of circumferentially spaced straps 60. The baffle plate is preferably large enough to extend laterally beyond the downcomer as shown so as to better direct gas flow away from the bottom end of the downcomer. The catalyst is discharged from the downcomer in the general direction shown by the arrows in FIG. 3B.

Although the embodiment of FIG. 1 has been described as it would be used to produce unsaturated nitriles, it also may be used for other vapor-phase oxidation reactions, e.g., production of phthalic anhydride by oxidation of naphthalene using vanadium pentoxide or other suitable catalyst or by oxidation of O-xylene using a vanadium oxide catalyst fluxed with a compound of $SO_3$ and an alkali metal oxide such as potassium oxide supported on a porous particulate silica gel support. To produce phthalic anhydride, the naphthalene is introduced to the reaction zone via line 16 from a suitable supply substituted for olefin supply 20 and air is supplied via line 8 or 14. The line 18 is unused. The downcomers not only facilitate keeping the catalyst at a high level of activity but also prevent classification, i.e., stratification according to size, of the catalyst particles in the bed.

FIG. 4 shows another embodiment of the invention and is illustrative of the fact that the invention is also adaptable to reactors where it is desired to establish different temperature zones in the fluid bed or where the vapor-phase oxidation reaction process is more advantageously carried out in more than one stage or involves more than one oxidation reaction. In this embodiment the reactor comprises a vessel 62 provided with an interior distributing grid 64 adjacent to its bottom end. Supported on grid 64 is a bed 66 of a selected catalyst. Mounted within the reactor in vertical spaced relation are two baffles 68 and 70 which are used to assist in the establishment of three zones in the catalyst bed. The baffles may be of any suitable design which does not impede movement of catalyst in the bed. By way of example, each baffle may consist of a plate with perforations that are relatively large with respect to the average size of the catalyst particles. The reactor may also include temperature control elements in the form of U-tube heat exchangers 72, 74 and 76 through which heat-exchanging fluid is circulated continuously via appropriate lines (not shown) to provide selective temperature control in the several zones of the catalyst bed. The heat exchangers may be operated so as to effect heating or cooling, depending upon the particular reaction process being carried out in the reactor. Thus, by way of example, if the reaction process is a two-step oxidation reaction or if it is more advantageously carried out in successive reaction zones, the heat exchangers 72 and 74 may be operated so that the zones in which they are located function as reaction zones, while the heat exchanger 76 may be operated so that the upper zone of the bed 6 demarcated by baffle 70 is cooler than the two reaction zones, thereby to quench the reaction. The level above bed 66 (demarcated by broken line 77) is the catalyst-disengaging zone.

The bottom of the reactor is provided with an inlet port to which is connected a line 78 that leads to a suitable supply of fluidizing gas which may be oxygen or air. Connected to another inlet port in the reactor located at a suitable height above the grid 64 is another line 80 through which the feed material to be reacted is supplied. A third inlet port in the reactor just above the level of baffle 68 is fitted with another inlet line 82 that leads to the supply of oxidizing gas. The upper end of the reactor vessel has an outlet port fitted with a line 84 that leads to recovery apparatus. Although not shown, it is to be understood that the upper end of the reactor may include suitable solids-separating equipment such as a filter unit to remove catalyst fines from the effluent.

Mounted within the reactor vessel are three pairs of downcomers 88, 90 and 92 similar to the downcomers shown in FIG. 1. Downcomer 88 extends from just above grid 64 to just below baffle 70. Downcomer 92 extends from just below the disengaging zone to a point short of baffle 70. This arrangement of downcomers minimizes stratification of catalyst in the bed and promotes more uniform temperature distribution in each zone of the fluid bed. Additionally the introduction of air via lines 78 and 82 and the recirculation of catalyst by downcomers 88 and 90 assures that the catalyst in the two reaction zones will be held at a high average level of activity since spent catalyst is being constantly returned to an oxygen-rich region of the bed.

Although the catalyst bed in the reactor of FIG. 4 has three discrete zones in addition to the catalyst disengaging zone, the invention also is applicable to reactors having a different number of zones in the catalyst bed.

Although the invention has been described with respect to downcomers of circular cross section, it is to be understood that other shapes also may be used, e.g., square, rectangular, oval, triangular, hexagonal, etc. Furthermore the top ends of the downcomers may be flared. It also is contemplated that the downcomers may be adapted for aeration to prevent catalyst "bridging" therein. Thus an air inlet pipe may be connected to each downcomer, preferably near its bottom end as indicated by pipe 96 in FIG. 3B, to introduce air to the interior of the downcomer. This additional air also promotes catalyst regeneration.

It also is contemplated that the downcomers may be inclined so as to provide horizontal as well as downward vertical movement of the catalyst. The downcomers may be inclined as much as 60° from the vertical but preferably are inclined 20°–30°. The horizontal movement which is effected by tilting the downcomers provides improved catalyst turnover and regeneration.

The cross-sectional area of the interior of the downcomers does not appear to be critical except that it should be large enough to permit flow of catalyst therethrough under operating conditions in a reactor. In practice, the downcomers are made of conventional pipe having interior diameters of at least 2 inches and up to about 10 inches for reactor vessels exceeding 3 feet in interior diameter. Although a single downcomer may be used, it is preferred that at least two and preferably more be used in a reactor. The exact number of downcomers is a matter of choice with consideration for the relative sizes of the downcomers and reactor, catalyst particle size, and catalyst bed height and an essential advantage of the invention is that it reduces the amount of catalyst required since it promotes better circulation and, as in the embodiment of FIG. 1, it promotes autoregeneration of the catalyst. Another advantage is that the downcomers reduce the "equivalent diameter" of the reactor (as the term is defined by W. Volk, et al., "Effect of Reactor Internals on Quality of Fluidization," *Chemical Engineering Progress*, Vol. 58, No. 3,) thereby reducing the problem of scaling from laboratory-size to commercial-size reactors. A further advantage is that the percent conversion of feedstock to product is enhanced by the increased catalyst turnover and, in the case of catalyst autoregeneration, by the catalyst being maintained at a high level of activity. It also is to be appreciated that the downcomers as herein described are not limited to returning catalyst to a regeneration zone but may also be used in any fluid bed reactor to get increased catalyst turnover (i.e., increased circulation of catalyst from the top to the bottom of the fluidized bed) for better reactor performance.

What is claimed is:

1. In an apparatus for catalytic vapor-phase reaction comprising a reactor vessel, a porous grid in said vessel, a bed of a selected particulate catalyst in said vessel and supported by said grid, said bed comprising a catalyst regeneration zone and a reaction zone located above said regeneration zone, a source of gas for fluidizing said bed, means for supplying said fluidizing gas to said bed through said grid so as to provide dense phase turbulence to said bed, reactant supply means for supplying at least one reactant vapor directly to the reaction zone of said bed; and means for withdrawing reaction effluent from said reaction chamber at a point above said bed, the improvement which comprises at least one downcomer pipe disposed wholly within said bed, said downcomer pipe having an open top end disposed in said reaction zone and an open bottom end disposed in said regeneration zone and spaced above said grid, and means at said bottom end for limiting upward flow of gas through said pipe while permitting discharge through said bottom end of catalyst flowing downward in said pipe.

2. Apparatus according to claim 1 wherein said last-mentioned means comprises a baffle mounted adjacent to but spaced from bottom end.

3. Apparatus according to claim 1 wherein said last-mentioned means comprises a flapper valve mounted so as to open under the influence of catalyst flowing downward in said downcomer pipe.

4. Apparatus according to claim 1 wherein said last-mentioned means comprises a cup disposed over but in spaced relation to said bottom end of said pipe.

5. Apparatus according to claim 1 wherein the bottom end of said downcomer terminates below the level at which said at least one reactant vapor is introduced to said catalyst bed.

6. Apparatus according to claim 1 wherein said vessel has a diameter of at least 3 feet and said downcomer pipe has a diameter of at least 2 inches.

7. Apparatus according to claim 1 wherein said catalyst bed comprises a second reaction zone located above said first-mentioned reaction zone, and further including means for introducing a reactant to the bottom end of said second reaction zone.

8. Apparatus according to claim 7 including a downcomer pipe with open top and bottom ends disposed wholly within said second reaction zone, and means at the bottom end of said second downcomer pipe for limiting upward flow of gas and vapor through said second pipe while permitting catalyst in said second pipe to be discharged through the bottom end thereof.

9. In a system for catalytically reacting at least two reactants in the vapor phase and concurrently regenerating spent catalyst by contact with a gaseous regenerating agent, said system comprising a reactor vessel, a fluidized dense phase catalyst bed of a selected particulate catalyst in said vessel, said bed comprising a catalyst regeneration zone to which said gaseous regenerating agent is admitted and at least one reaction zone located above said catalyst regenerating zone to which said reactants are delivered, and said vessel also having a catalyst disengaging zone above said bed from which reaction effluent is recovered, the improvement which comprises at least one downcomer pipe located within said bed for circulating catalyst from said at least one reaction zone to said catalyst regenerating zone, said pipe extending from said at least one reaction zone to said catalyst regenerating zone and having an open top end that terminates short of the upper end of said bed and an open bottom end that terminates short of the lower end of said bed, and means in said bed at the bottom end of said pipe for limiting upward flow of gases through said pipe while permitting discharge of catalyst particles flowing downward in said pipe.

* * * * *